PARTIALLY TRANSMITTING MIRROR

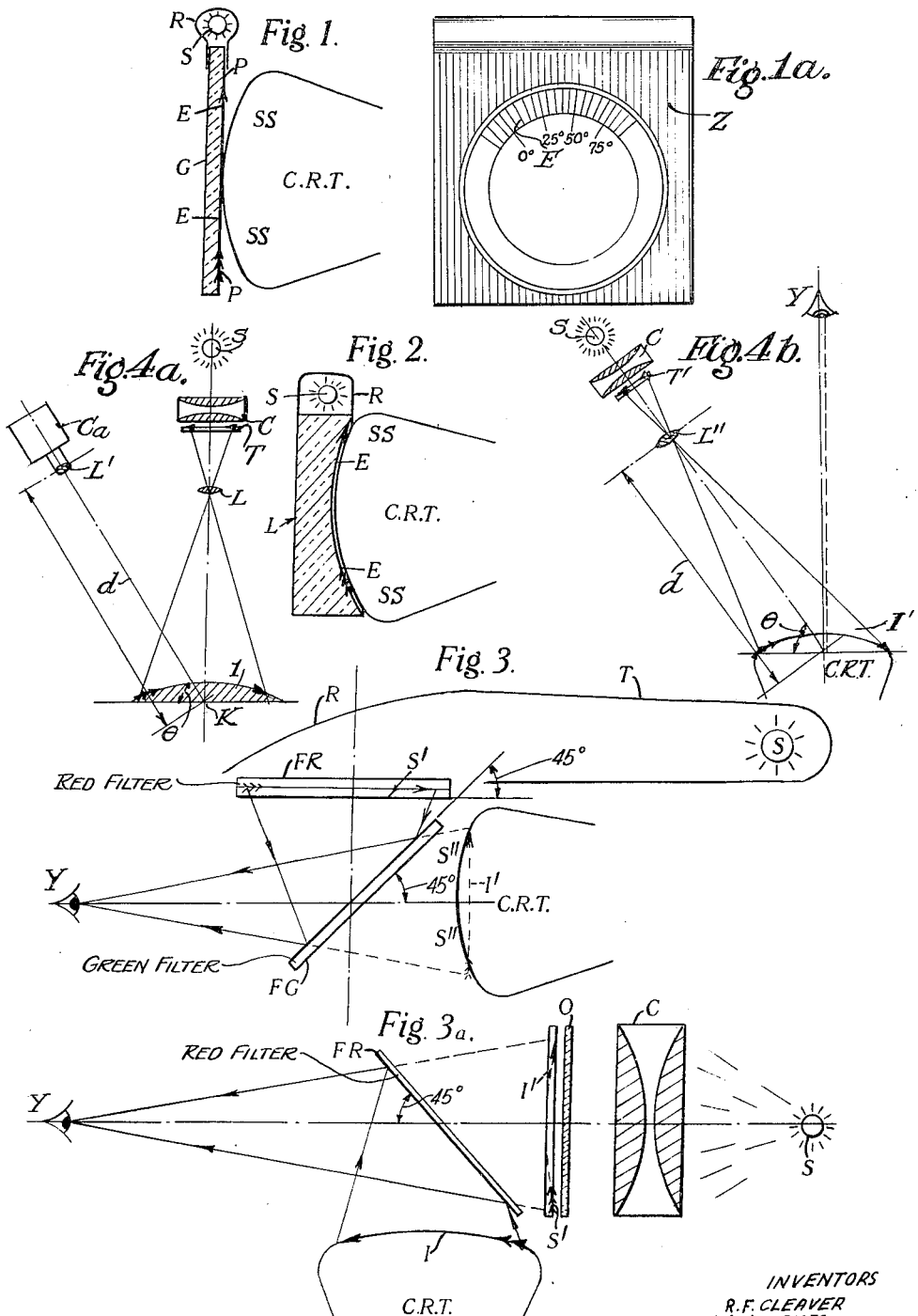

Patented Aug. 12, 1941

2,251,984

UNITED STATES PATENT OFFICE 2,251,984

OSCILLOGRAPH SCALE SYSTEM

Richard Francis Cleaver, Ivor Reginald John James, and Charles Frederick Allen Wagstaffe, London, England, assignors to International Standard Electric Corporation, New York, N. Y.

Application May 21, 1938, Serial No. 209,230
In Great Britain May 28, 1937

4 Claims. (Cl. 177—329)

This invention relates to cathode ray apparatus and more particularly to such apparatus in which a scale or the like is associated with the fluorescent screen of a cathode ray tube for the purpose of giving a measurable indication.

One example of the use of such apparatus is a cathode ray oscillograph tube employed in conjunction with a radio direction finder to give a visual indication of the bearing of a distant station in the form of the angle, read off on a suitable scale, between a luminous line on the screen of the oscillograph, due to the signal, and a fixed reference line on the scale. So far as we are aware, the plan heretofore used is to paint or print the scale on the end of the oscillograph tube. This system suffers from numerous disadvantages. The painting or printing of the scale on the curved surface at the end of the tube presents considerable difficulty. The scale has to be illuminated and the light falling on the screen diminishes the relative brilliance of the line due to the signal. Moreover, the scale is fixed relative to the deflecting plates of the oscillograph. This renders it necessary to lay out the direction finder aerials always with a predetermined orientation which may be very inconvenient.

An object of the invention is the provision of a scale system for cathode ray tube oscillographs in which these disadvantages are overcome. This object is achieved by disasssociating the actual scale from the oscillograph screen.

According to one feature of the invention in a cathode ray oscillograph scale system, the scale is provided on a sheet of glass or on a planoconcave lens which is placed in front of the oscillograph screen and through which the screen is viewed by the observer.

According to another feature of the invention a real or a virtual image of the scale is adapted to be viewed by the observer on the oscillograph screen, or conversely a virtual image of the oscillograph screen may be viewed by the observer on a scale disassociated with the screen.

According to another arrangement a real image of the scale is projected on the oscillograph screen and a virtual image of the screen is viewed by the observer.

These and other features of the invention will be more clearly understood from a reading of the following description in conjunction with the accompanying drawings in which:

Fig. 1 shows one embodiment of the invention;

Fig. 1a is a fragmentary view of a detail of Fig. 1;

Fig. 2 is a modification of the arrangement of Fig. 1;

Fig. 3 shows another embodiment in which a virtual image of the scale is viewed by the observer;

Fig. 3a illustrates an embodiment in which a virtual image of the oscillograph screen is viewed by the observer;

Fig. 4a shows an arrangement for producing a photographic transparency of a scale;

Fig. 4b shows a system for projecting a real image of this photographic transparency on the oscillograph screen;

Figure 5:
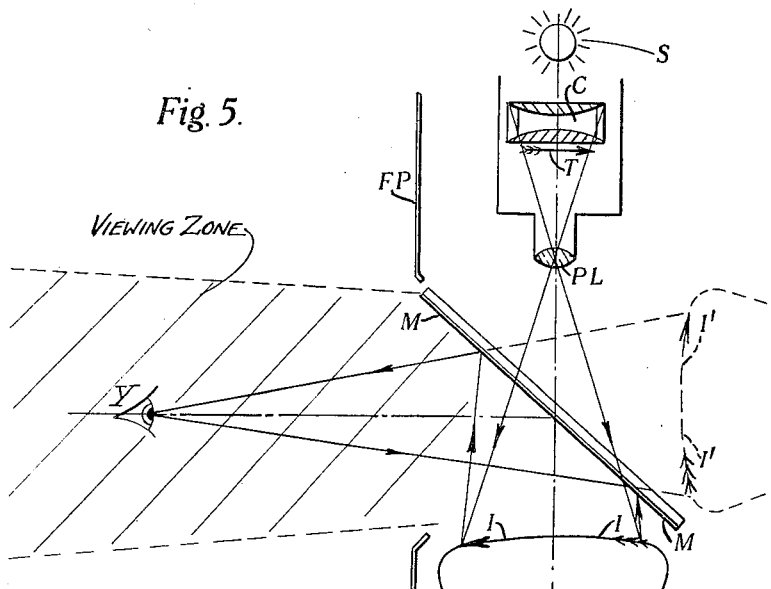
Fig. 5 shows another embodiment in which a real image of a scale is projected onto the oscillograph screen, a virtual image of which is viewed.

Referring to Fig. 1, C. R. T. represents the end of the cathode ray tube and SS the oscillograph screen. The scale E is engraved on the back surface of a piece of plate glass G placed in front of and almost in contact with the end of the tube. In this figure and in the other figures the scale in section or its electronic image is shown as a solid or a dotted arrow. The plate G is illuminated from the edge by a tubular filament lamp S surrounded by a metal reflector R. A black mass Z, shown in Fig. 1a, extends over the edges of the glass plate. The engraving should be filled with opaque material to prevent light from passing back onto the screen SS.

In the above arrangement parallax will occur at the regions P near the edges of the scale. To overcome this disadvantage the sheet of glass may be replaced by a plano-concave lens L, Fig. 2, of required diameter and curvature. The concave surface carries the engraved scale E and is shaped to fit the curved surface of the oscillograph tube C. R. T. Parallax is thus greatly reduced because of the reduced spacing between the scale and the tube surface.

In either of the above-described arrangements the scale may be produced on the glass plate G or lens L by photographic means or acid etching.

Referring to the modification of Fig. 3, S is a source of light, T a metal tube painted white internally and R a white diffusive reflector. The scale S' is photographed on a sheet of glass FR in clear divisions on a black ground. FG is a reflector. FR is a red filter and FG a green filter. A virtual image I' of the scale is produced on the screen S" at the end of the cathode ray tube. The virtual image is plane but its position can be so adjusted that parallax is negligible at any desired radius on the oscillograph screen. The colour filters are used for the purpose of suppressing the reflection of S' at the back surface of the reflector FG. Gelatine-on-glass filters may be used and it has been found to be immaterial whether the front or back surface of FG carries the gelatine coating, so far as the suppression of the second reflection is concerned. However, a better reflection of the scale is obtained from the uncoated surface of the glass and in practice the dyed gelatine coating is placed on the back of the plate glass reflector, nearer the oscillograph. Polarising filters may be used in place of colour filters.

Fig. 3a shows a further modification using one colour filter FR or a thinly silvered mirror. S is a source of light, C a condenser and O a sheet of opal glass. The scale S' is photographed on a sheet of glass placed in front of the opal glass O. The reflector FR acts as a red filter and causes a virtual image I' of the signal image I at the end of the screen to appear on the scale S'. The colour filter FR in this case operates in a manner exactly like the filters of Figure 3. The red light coming from the source S and the glass screen O will readily pass through filter FR and continue on to the eye and the blue green light from the cathode ray tube, or the signal image will be reflected from the color filter plate FR. There will be no double image formation of the signal image since the red filter material on the plate will not allow the blue green light to pass through the plate or if the color filter material were on the opposite side of the plate would not allow the blue green light to be reflected from the opposite surface of that plate. A thinly silvered mirror which reflects say 90% and transmits say 10% of incident light may be used in place of the filter FR. The use of a thinly silvered mirror is to be preferred since it permits the use of a scale of any colour and gives a more brilliant image.

According to a further modification illustrated in Fig. 4b, a real image I' of an undistorted scale is projected onto the end of the oscillograph tube C. R. T. The real image may be projected from a slide T' produced from a photograph obtained in the manner shown in Fig. 4a, in which S is a source of light, C a condenser, T a photographic transparency of the scale with white lines on a black ground, L a projection lens, and K a wooden model of the end of the oscillograph tube painted white. A photograph is taken of the projection I of the scale on the block, by means of a camera Ca disposed on a line at an angle to the axis on which S, C, T, L and K are located. A real image I' (Fig. 4b) of the scale on the photographic transparency T' obtained from the photograph is then projected on the end of the tube C. R. T. in a manner which will be obvious from Fig. 4b in which S is a light source, C a condenser and L" a projection lens. The lenses L, L' and L" (Figs. 4a and 4b) are used with small stops to give sharp focus. In this manner an undistorted scale can be projected onto the screen of the oscillograph from a point not on the axis of the tube. The distance $d$ of the projection lens L" (Fig. 4b) from the end of the tube C. R. T. and the angle of projection $\theta$, should of course correspond respectively to the distance of the lens L' of the camera Ca (Fig. 4a) from the surface of the block K and the angle at which the photograph of the real image of T on the block K was taken.

Figure 5A:
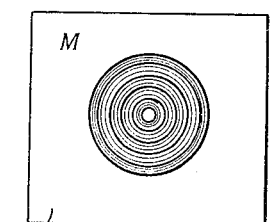
Fig. 5a shows a detail of Fig. 5.

Referring now to Fig. 5, which illustrates another embodiment very suitable for rack mounting, a real image I of a transparency of the scale T (clear markings on an opaque ground) is projected by a projector comprising light source S, condenser C and projection lens PL, onto the screen of the oscillograph tube C. R. T. Between the projector and the screen is interposed a mirror M, of special construction, having its plane at 45° to the axis of the oscillograph and thus permitting the screen to be viewed in a direction perpendicular to its axis. I' is the virtual image of the end of the tube. FP is the front panel of the apparatus. In order to avoid trouble due to double reflections, the mirror M must be very thin and silvered preferably on the front surface. As shown in Fig. 5a, it is formed with a number of thin circular concentric slits in its reflecting surface, which permit light from the projector to pass through the mirror without appreciably affecting the quality of the reflection of the oscillograph screen. The entire oscillograph screen is visible from any point within the shaded area indicated in Fig. 5.

Figure 5B:
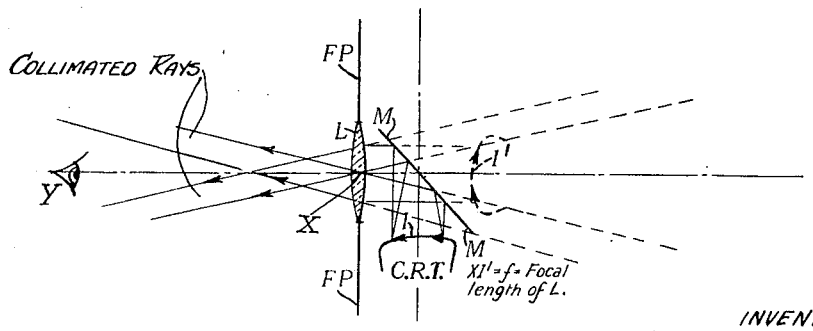
Fig. 5b shows an arrangement for magnifying the virtual image produced by the arrangement of Fig. 5.

A further improvement may be effected by adding a simple magnifying lens L, Fig. 5b, of large aperture through which the virtual image in the mirror M is viewed. Although this will not increase the apparent size of the image when viewed from near the front panel it will result in a considerable increase in the apparent size and hence the accuracy of observation when the oscillograph is viewed from a normal distance of say 12 inches from the front panel FP of the apparatus. Since the lens is adjusted so that the tube is at the full length XI' of the lens L it will enable accurate readings to be taken at a considerable distance from the equipment, the distance being limited only by the diameter of the magnifying lens L.

In all the above-described arrangements the North point on the scale is at the top and facilities are provided for rotating the cathode ray tube on its axis to accommodate any orientation of the direction finder aerials.

What is claimed is:

1. A cathode ray tube indicator arrangement comprising a cathode ray tube having a target at one end thereof, a transparent scale carrying means arranged parallel to the axis of said tube, a source of light arranged back of said scale carrying means, and a partially reflecting, partially transparent means arranged at a 45° angle with respect to said target and said scale carrying means for producing an apparent superposition of said scale and said target means of a virtual image.

2. A cathode ray tube indicator arrangement comprising a cathode ray tube having a target in one end thereof, a transparent scale carrying means arranged parallel to the axis of said tube, a source of light arranged back of said scale carrying means, a reflecting means arranged at a 45° angle with respect to said target and said scale carrying means, for producing an apparent superposition of said scale and said target by means of a virtual image, and color filter means to prevent direct superposition of light from said target and said scale on either of said devices.

3. A cathode ray tube according to claim 2 in which said scale is formed on a sheet of glass and the viewing direction is such that a virtual image of said scale is seen on said target.

4. A cathode ray tube indicator arrangement comprising a cathode ray tube having a target in one end thereof, a transparent scale carrying means arranged parallel to the axis of said tube, a source of light arranged back of said scale carrying means, a partially silvered mirror arranged at a 45° angle with respect to said target and said scale carrying means, for producing an apparent superposition of said scale and said target by means of a virtual image.

RICHARD FRANCIS CLEAVER.
IVOR REGINALD JOHN JAMES.
CHARLES FREDERICK ALLEN
               WAGSTAFFE.